United States Patent
Alonso Alarcon et al.

(10) Patent No.: US 8,914,421 B2
(45) Date of Patent: Dec. 16, 2014

(54) DATA MANAGEMENT AT A DIRECTORY DATABASE

(75) Inventors: Antonio Alonso Alarcon, Getafe (ES); Emiliano Merino Vazquez, Leganés (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 25 days.

(21) Appl. No.: 13/577,404

(22) PCT Filed: Dec. 8, 2010

(86) PCT No.: PCT/EP2010/069167
§ 371 (c)(1), (2), (4) Date: Oct. 17, 2012

(87) PCT Pub. No.: WO2011/098168
PCT Pub. Date: Aug. 18, 2011

(65) Prior Publication Data
US 2013/0204907 A1 Aug. 8, 2013

Related U.S. Application Data

(60) Provisional application No. 61/303,470, filed on Feb. 11, 2010.

(51) Int. Cl.
*G06F 17/30* (2006.01)
*H04L 12/935* (2013.01)

(52) U.S. Cl.
CPC ...... *G06F 17/30952* (2013.01); *H04L 49/3009* (2013.01); *G06F 17/30362* (2013.01)
USPC ........... 707/803; 707/784; 707/769; 707/828; 709/219; 709/224; 709/238; 370/220; 370/236; 370/238

(58) Field of Classification Search
CPC ............. G06F 17/30362; G06F 17/30952; H04L 49/3009; H04L 54/12; H04L 41/0668
USPC .......... 707/803, 828, 784, 769; 709/217, 218, 709/219, 229, 224, 238; 719/318; 370/220, 370/236, 238
See application file for complete search history.

(56) References Cited

U.S. PATENT DOCUMENTS 4,648,036 A * 3/1987 Gallant ................. 707/E17.007
5,693,076 A * 12/1997 Kaemmerer ..................... 607/59

(Continued)

FOREIGN PATENT DOCUMENTS

WO 2009060266 A1 5/2009

OTHER PUBLICATIONS

Hai Jin, Wenjun Gong, Song Wu, Muzhou Xiong, Li Qi, and Chengwei Wang—"An Efficient Data Management System with High Scalability for ChinaGrid Support Platform"—Advanced Parallel Processing Technologies Lecture Notes in Computer Science—vol. 3756, 2005, Hong Kong, China, Oct. 27-28, 2005—pp. 282-291.*

Shaoyi Yin; Xiaofeng Meng and Philippe Pucheral—"A sequential indexing scheme for flash-based embedded systems"—Proceeding EDBT '09 Proceedings of the 12th International Conference on Extending Database Technology: Advances in Database Technology, Mar. 24-26, 2009—pp. 588-599.*

(Continued)

*Primary Examiner* — Anh Ly
(74) *Attorney, Agent, or Firm* — Coats & Bennett, PLLC

(57) ABSTRACT

Data management at a directory database having a data entry in a directory includes associating the data entry with first status information representing a first current storage status of the data entry at the directory database. The directory database receives, from a client, a request for modifying the data entry, and in association with the request, second status information representing a second current storage status of the data entry at the directory database. The second current storage status indicates a latest available current storage status of the data entry as available to the client. The directory database will modify the data entry according to the request if the first status information and the second status information are determined to match with respect to the first and second current storage statuses of the data entry at the directory database.

18 Claims, 7 Drawing Sheets

(56) References Cited

U.S. PATENT DOCUMENTS

| | | | |
|---|---|---|---|
| 6,145,016 A * | 11/2000 | Lai et al. | 709/217 |
| 6,341,285 B1 | 1/2002 | Blott | |
| 6,557,083 B1 * | 4/2003 | Sperber et al. | 711/144 |
| 6,944,720 B2 * | 9/2005 | Sperber et al. | 711/144 |
| 7,548,989 B2 * | 6/2009 | Alexander et al. | 709/232 |
| 8,185,501 B1 * | 5/2012 | Cherukumudi et al. | 707/647 |
| 2003/0191903 A1 * | 10/2003 | Sperber et al. | 711/144 |
| 2004/0024658 A1 * | 2/2004 | Carbone et al. | 705/28 |
| 2004/0266441 A1 * | 12/2004 | Sinha et al. | 455/445 |
| 2006/0173719 A1 * | 8/2006 | Kuhn et al. | 705/3 |
| 2006/0195575 A1 * | 8/2006 | Delany et al. | 709/225 |
| 2008/0147657 A1 * | 6/2008 | Vora et al. | 707/6 |
| 2008/0234002 A1 * | 9/2008 | Yamashita et al. | 455/561 |
| 2008/0256095 A1 * | 10/2008 | Wakefield | 707/100 |
| 2009/0070308 A1 * | 3/2009 | Walters et al. | 707/4 |
| 2010/0318541 A1 * | 12/2010 | Golwalkar et al. | 707/759 |
| 2012/0089993 A1 * | 4/2012 | Alonso Alarcon et al. | 719/318 |

OTHER PUBLICATIONS

Zeilenga, K., "Lightweight Directory Access Protocol (LDAP) Assertion Control." IETF RFC 4528, Jun. 2006. IETF, Geneva, Switzerland.

Chiu, L. et al., "High Level Specification of Concurrency Control in Distributed Database Systems"; Proceedings of the International Conference on Software Engineering, Singapore, Apr. 11-15, 1988; pp. 309-317; Washington, IEEE Comp. Soc. Press, US, vol. Conf. 10, Apr. 11, 1988.

Zeilenga, K., "LDAP Transactions." Internet-Draft, Dec. 2008. IETF, Geneva, Switzerland.

Zeilenga, K., "Lightweight Directory Access Protocol (LDAP): Director Information Models." IETF RFC 4512, Jun. 2006, IETF, Geneva, Switzerland.

Sermersheim, J., Ed., "Lightweight Directory Access Protocol (LDAP). The Protocol." IETF RFC 4511, Jun. 2006. IETF, Geneva, Switzerland.

* cited by examiner

DATA MANAGEMENT AT A DIRECTORY DATABASE

TECHNICAL FIELD

The invention relates to telecommunication, particularly to methods for data management at a directory database, and more particular to an LDAP Mutual Exclusion Mechanism Enforced at Directory Server side. It further relates to a directory database, a computer program, a computer program product, a client, and a communication system.

BACKGROUND

Currently 3rd Generation Partnership Project (3GPP) User Data Convergence (UDC, 3GPP terminology) is being standardized for coming 3GPP Release 9. A new architecture illustrated in FIG. 1 in the Core Network (CN) 100 is proposed where subscriber service related data and business logic of different network elements are separated. This way, a User Data Repository 102 (UDR, 3GPP terminology) is used as a centralized database, so that the different application front-ends 106-110 can access the user data (through the new "Ud" reference point 112). A requirement is to minimize the impact on existing network by introducing UDC.

Functional entities, such as the Home Location Register (HLR)/Home Subscriber Server (HSS), Authentication Centre (AuC), Application Servers, Provisioning system, etc., when the UDC architecture is applied, keep the application logic, but they do not locally store user data permanently. These data-less functional entities are collectively known in the UDC architecture as application front-ends (FEs) 106-110.

Lightweight Directory Access Protocol (LDAP, Internet Engineering Task Force (IETF) standard) has been nowadays agreed (stage-3 activities are in progress) as the data-access protocol to be used in the Ud interface for CRUD (Create, Read, Update, Delete) operations.

According to UDC architectural principles, each application-FE can manage any subscriber-related request at any time. And for many applications more than one application-related procedure (i.e. operation) can be managed towards the exact same subscriber concurrently (i.e. in parallel). In consequence, there can be situations in which two (or more) different application-FE instances are managing two (or more) different application-related requests for the exact same piece of data (i.e. the exact same subscriber directory entries/attributes managed in UDR).

For example, one 3G mobile subscriber is moving across the Home network (so a "Location Update" procedure is issued internally in the Core Network to update the subscriber location) and, at the same time, the same subscriber is invoking a "subscriber procedure" to change the redirection number for the (previously activated) "Call Forwarding on No Reply" Supplementary Service.

In the previous example two different HLR-FE instances (the one managing the issued "Mobile Application Part (MAP, SS7 stack) Location Update" procedure and the one managing the invoked subscriber-procedure) are trying to access and modify the exact same piece of data in UDR at the same/nearly time.

There are many other network use-cases in which this kind of situations can happen. According to a first example, a Provisioning-FE entity may try to update a subscriber profile (as a result of a provisioning order received from Customer Administration System (CAS)) and, at the same time, an application-FE is trying to update the exact same piece of data (or some common part). According to a second example, two different FE instances from two different applications may try to modify some common (to both applications) data for the same subscriber profile.

It is noted that the first Use Case (UC) in the previous list of examples (involving a Provisioning-FE instance) is maybe the most generic UC to happen (as it is independent of an application allowing—or not—to process two or more procedures related to the exact same subscriber in parallel from two or more different FE instances).

In all these kind of situations "data consistency" problems could arise if some mutual-exclusion mechanism is not guaranteed in UDR, as better shown in a sequence diagram of FIG. 2 (which is taken as a graphical example):

In particular, such a problematic situation may arise from two clients such as an HLR-FE 206 and a Provisioning-FE 208 both requesting modification of a data entry at a directory database such as an UDR 202. The steps of the exemplary sequence diagram of FIG. 2 are as follows:

In a first step 216, the HLR-FE 206 receives a MAP Location Update particularly from a subscriber. In a further step 218, the HLR-FE 206 requests to read a subscriber profile associated with the subscriber, and the HLR-FE 206 sends a respective LDAP Search Request to the UDR 202. Accordingly, the UDR 202 sends respective profile data to the requesting HLR-FE 206. Thereupon, in a further step 220, the HLR-FE 206 executes an application related logic, and particularly may process the received profile data of the subscriber.

In a next step 222, the Provisioning-FE 208 receives a Provisioning order particularly from CAS. In a next step 224, the Provisioning-FE 208 requests to read the subscriber profile associated with the subscriber, and sends a respective LDAP Search request to the UDR 202. Accordingly, the UDR 202 sends respective profile data to the requesting Provisioning-FE 206. Thereupon, in a step 226, the Provisioning-FE 206 executes an application related logic and particularly may process the received profile data of the subscriber.

In a step 228, the Provisioning-FE 208 requests to update the subscriber profile stored at the UDR 202 by sending a respective LDAP Modify Request. Accordingly, the UDR 202 updates the subscriber profile, and sends information about the update process, particularly an updated subscriber profile, to the Provisioning-FE 208.

In a step 230, the HLR-FE 206 also requests to update the subscriber profile stored at the UDR 202 by sending a respective LDAP Modify Request. Accordingly, the UDR 202 also updates the subscriber profile, and sends information about the update process, particularly an updated subscriber profile, to the Provisioning-FE 208.

Thus, in step 228 of FIG. 2 the subscriber profile is updated (by the Provisioning-FE 208), so the profile managed by HLR-FE instance 206 (read in step 216) is an "old" one from that moment on. The final update operation issued by the HLR-FE 206 in step 230 does not take into account the introduced changes in step 228, so there is a data-consistency risk (e.g. some attribute values introduced in step 228 could be overwritten in step 230; alternatively or in addition, in steps 228 and 230 different data—but still related—may be updated, so data-consistency at application level can be "damaged").

To avoid these situations some solutions have currently been proposed for LDAP, which however, suffer from a common problem as all of them require a special behavior in the LDAP clients to help the LDAP Directory Server (i.e. UDR) to detect the update-collision (so the mutual-exclusion algorithm associated to each of these solutions can be triggered).

In all these solutions the LDAP server (i.e. the one that must assure data consistency properties for the data it is storing) is not the entity deciding when the mutual-exclusion mechanism must be triggered; in the end, it is the application-FE the entity deciding it (providing also the required data to execute the associated mutual-exclusion algorithm). A drawback may be that these solutions may only be valid for walled-garden environments, i.e. those in which both the LDAP directory server and the LDAP client belongs to the same operator domain due to the strict control on the LDAP client behavior required from the "solution owner". A further drawback may be that these solutions are error-prone solutions as they depend on the right behavior for each individual LDAP client. Even another drawback may be that an integration of Application-FEs in a deployed layered architecture may be difficult, costly, and time-consuming, because the LDAP clients included in those FEs must be adapted to follow the required right behavior. Furthermore, these solutions may come along with unsolved vendor interoperability issues and further barriers to solve when trying to integrate a deployed UDR with 3PP applications-FEs.

SUMMARY

It may be an object of the invention to provide methods for data management at a directory database, a directory database, a computer program, a computer program product, a client, and a communication system which may allow for data consistency at a directory database in particular in case of multiple modify accesses of the directory database by one client or different clients.

In order to achieve the object defined above, methods for data management at a directory database comprising a data entry in a directory, a directory database, a computer program, a computer program product, a client, and a communication system according to the independent claims are provided.

According to an exemplary aspect of the invention, a method for data management at a directory database comprising a data entry in a directory is provided. The method, particularly performed at a directory database, comprises the following steps: In a first step, the data entry is associated with first status information representing a first current storage status of the data entry at the directory database. In a further step, a request for modifying the data entry is received from a client. In yet a further step, it is received from the client, in association with the request, second status information representing a second current storage status of the data entry at the directory database. The second current storage status indicates a latest available current storage status of the data entry as available to the client. In yet a further step, the data entry is modified according to the request if the first status information and the second status information are determined to match regarding the first current storage status of the data entry at the directory database and the second current storage status as received from the client.

According to another exemplary aspect of the invention, a directory database is adapted to perform the steps of a method for data management at a directory database comprising a data entry in a directory as described above.

According to another exemplary aspect of the invention, a computer program to be executed by a processing unit of a directory database comprises code adapted to perform the steps of a method for data management at a directory database comprising a data entry in a directory as described above.

According to another exemplary aspect of the invention, a method for data management at a directory database compris-ing a data entry in a directory is provided. The method, particularly performed at a client, comprises the following steps. First status information representing a first current storage status of the data entry at the directory database is received. Second status information representing a second current storage status of the data entry at the directory database is associated with a request for modifying the data entry based on the first status information. The second current storage status indicates a latest available current storage status of the data entry as available to the client. Furthermore, the request for modifying the data entry in association with the second status information is sent.

According to another exemplary aspect of the invention, a client is adapted to perform the steps of a method for data management at a directory database comprising a data entry in a directory as described in the paragraph above.

According to another exemplary aspect of the invention, a communication system comprises a directory database and at least one client, both as described before.

Further embodiments of the methods for data management at a directory database, the directory database, the computer program, the computer program product, the client, and the communication system are defined in the dependent claims.

BRIEF DESCRIPTION OF THE DRAWINGS

Embodiments of the invention will be described in more detail herein after with reference to examples, but to which the scope of the invention is not limited.

DETAILED DESCRIPTION

Figure 1:
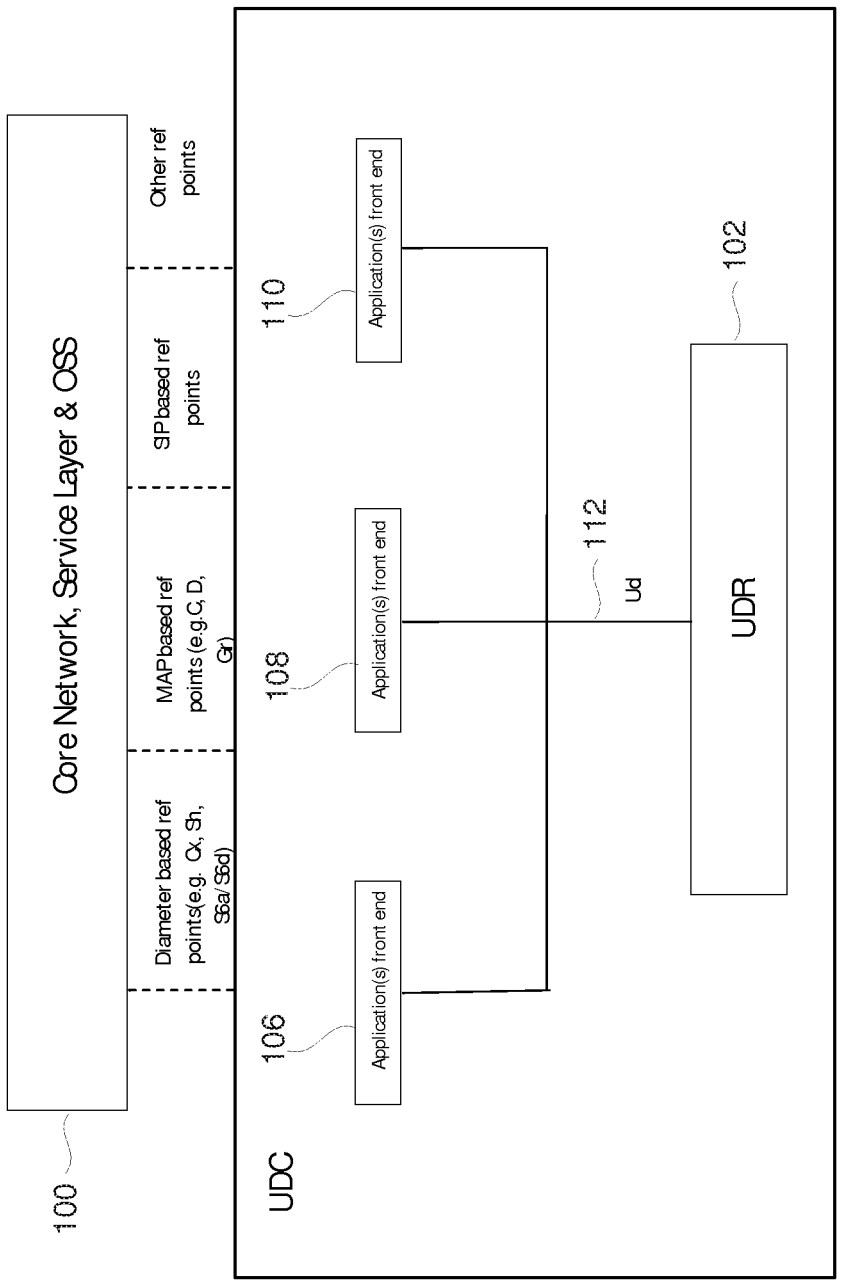
FIG. 1 is a block diagram illustrating a communication architecture employing 3GPP User Data Convergence.
Figure 2:
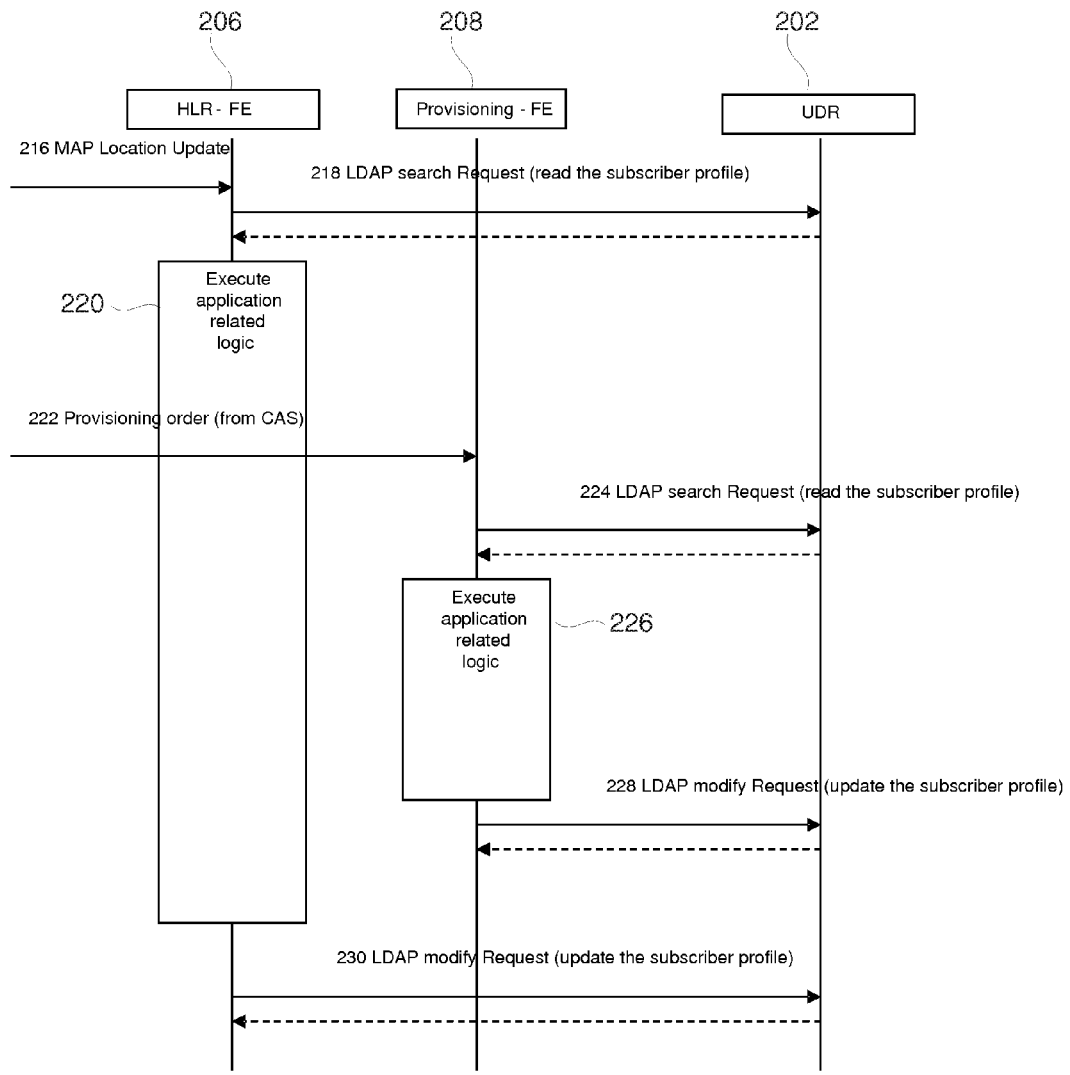
FIG. 2 is a flow diagram illustrating a communication between an HLR front-end entity, a provisioning front-end entity, and a user data repository.

The illustration in the drawings is schematic. In different drawings, similar or identical elements are provided with the same reference signs.

In the following, a method for data management at a directory database according to an exemplary embodiment of the invention will be described.

A method for data management at a directory database comprising a data entry in a directory may comprise the following steps particularly performed at a directory database: associating the data entry with first status information representing a first current storage status of the data entry at the directory database, receiving from a client a request for modifying the data entry, receiving from the client, in association with the request, second status information representing a second current storage status of the data entry at the directory database, the second current storage status indicating a latest available current storage status of the data entry as available to the client, and modifying the data entry according to the request if the first status information and the second status information are determined to match regarding the first current storage status of the data entry at the directory database and the second current storage status as received from the client.

The method may help a directory database to enforce data integrity for concurrent data access scenarios.

Examples and explanations for better illustration are described in the following:

Examples for a directory database may be a UDR or LDAP server.

A "directory database" may be understood as a special repository technology which organizes the managed data objects (including its own—associated—attribute instances) in a logical and hierarchical manner. 3GPP UDC Rel.9 defines the UDR functional element as a "Directory Database" common to all application front-end (FE) instances.

An example for a data entry may be a subscriber profile.

It is noted that a data entry may be denoted as directory entry in some exemplary directory databases.

It is noted that a single subscriber profile could be defined and managed (into a Directory DB) as a single "directory entry" or as a set of directory entries (as the Directory DB does not impose any semantic restriction about what a "directory entry" is).

An example for information representing current storage status for a data entry (e.g. for a specific "directory entry") at directory database is a entryDigest value.

EntryDigest may be a value (or set of values) that represent in a univocal way the current values stored in the attribute instances contained in that directory entry. For example, a digest value (associated to each directory entry) may be obtained from all the contained attribute values in the involved directory entry.

An example for a request for modifying may be a LDAP Modify request.

An example for a matching may be if it is determined that the first and second current status information are identical which is the typical case, other conditions may apply for a matching. For example, the first current status information may represent an interval into which the second current status information matches to, i.e. the second current status information being determined to fall into said interval. However, due to ease of implementation and security reasons, an "equality match" may be preferred as it is a very suited condition to check if the directory entry has been updated—by any other client—from the last read operation performed. An example for a matching check is depicted in particularly a checkbox 562 of FIG. 5, i.e. "is the current value stored in attribute "entryDigest" (in entry "e") equals to <value> received in the assertion filter". If this is evaluated to be YES, i.e. the matching is determined, then the data entry is modified, i.e. "process the received LDAP modify request operation", particularly as illustrated by a box 564 in FIG. 5. If this is evaluated to be NO, no matching is determined, then the received modify request operation is rejected", particularly as illustrated by a box 576 in FIG. 5 (see also claim 3 presented below and particularly the description of FIG. 5).

In particular, the "entryDigest" as an example of information representing current storage status for a data entry may be a parameter (particularly an operational attribute) associated with the data entry (particularly an object of the data entry). In particular, the entryDigest may be internally managed by the directory database. For example, the directory database may determine the value of the entryDigest to be stored in association with the data entry. In particular, the entryDigest may be assigned to a data entry particularly at creation time of the data entry or may be assigned at a configuration time of the data entry, for example when modifying the value of the data entry.

In particular, the entryDigest value may be generated using a function assigning an univocal value to the EntryDigest (parameter) particularly based on the content of the data entry, particularly based on another parameter(s)(particularly attribute(s)) associated with the data entry. In particular, the value of the entryDigest may be excluded or may be not considered in the generation process of the entryDigest. In particular, such a function may be hash function, and the value of the entryDigest may be a (particularly integer) number.

Next, exemplary embodiments of the method for data management at a directory database will be explained. However, these embodiments also apply to the respective directory database, the respective communication system, the respective computer program, the respective computer program product, the respective client method, and the respective client as described in the "Summary" Section and the "Detailed description" section.

The method may further comprise the steps of obtaining third status information representing a modified current storage status of the modified data entry at the directory database, and associating the modified data entry with the third status information.

An example may be the following: The third status information replaces the first status information after modification of the data entry according to the request for modification. This "modified current storage status" represents the current storage status of the data entry after applying the requested update.

The method may further comprise the steps of receiving from the client or a further client a further request for modifying the data entry at the directory database, receiving from the client or the further client, in association with the further request, forth status information representing a forth current storage status of the data entry at the directory database, the forth current storage status indicating a latest available current storage status of the data entry as available to the client or the further client, determining that the modified status information does not match to the forth status information regarding the modified current storage status of the data entry at the directory database and the forth current storage status as received from the client, and rejecting the further request for modifying by not modifying the modified data entry.

The method may further comprise the step of verifying if the client and/or the further client is registered at the directory database for an appliance of one or more of the matching determination, modification, and rejection steps.

Figure 5:
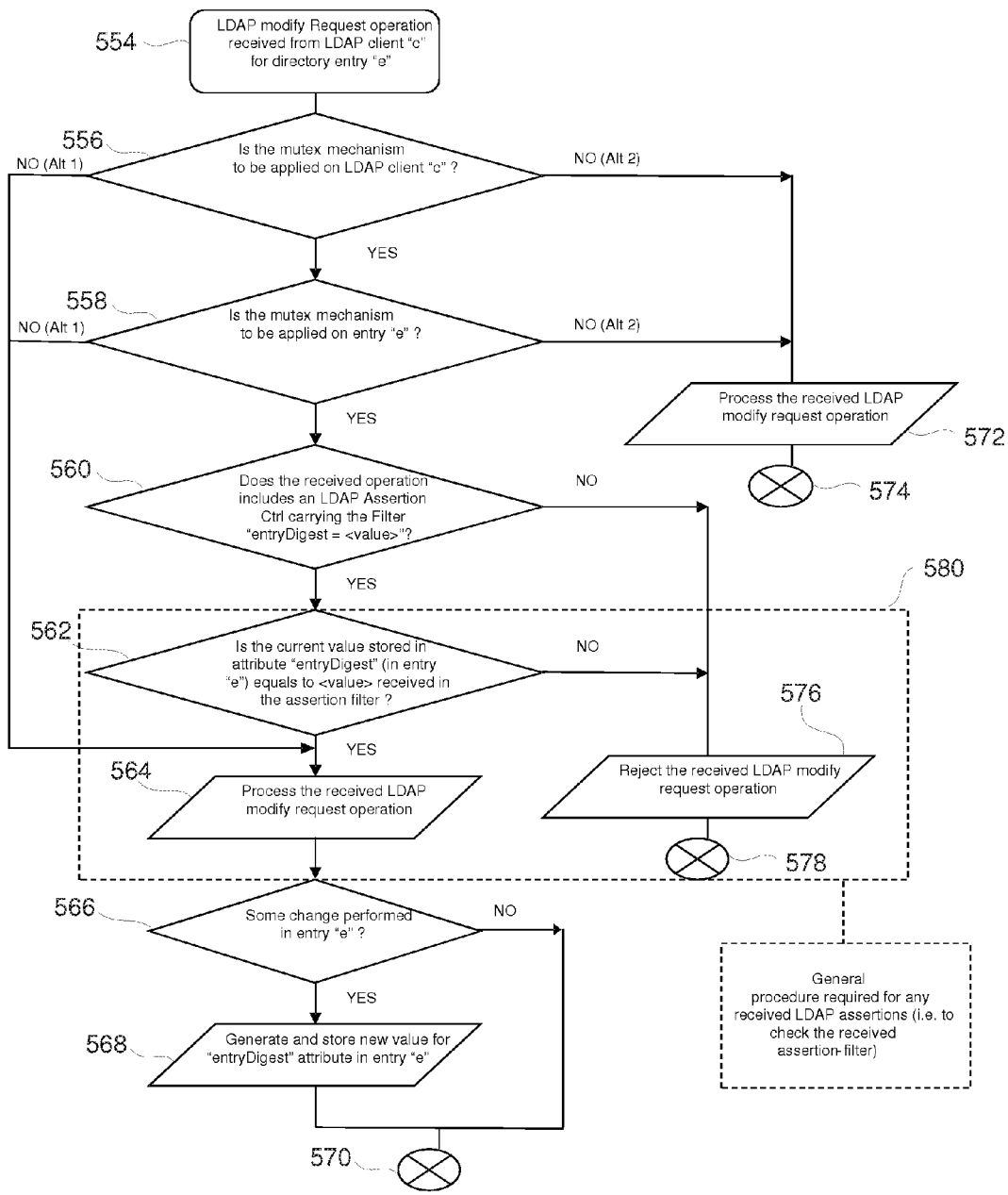
FIG. 5 is a flow diagram illustrating a method for data management at a directory database according to another exemplary embodiment of the invention.

An example may be a check like "is the mutex mechanism to be applied on LDAP client "c"?"", particularly as illustrated by a checkbox 556 in FIG. 5. The directory database may receive client identification data of the client and/or the further client in order to perform the verification step, e.g. in order to determine if client "c" is really "c" or if client "c" belongs to a group of clients entitled for these operations.

In particular, the mutex mechanism may also be denoted as mutex control (ctrl) mechanism.

The method may further comprise the step of verifying if the data entry is registered at the directory database for an appliance of one or more of the matching determination, modification, and rejection steps.

The data entry may be associated with an identifier indicating that this verification must be performed before actually processing or proceeding to the step of determining the match and, depending on the result of this verification check, the directory database proceeds towards the modification of the data entry or the rejection of the request. An example for such an identifier could be the mere presence of any status information representing any current storage status associated to the data entry, alternatively it could be an extra identifier, e.g. a flag, that has a predefined (e.g. permanent) value indicating the necessity for the verification. An example may be a check like "is the mutex mechanism to be applied on entry "e"", particularly as illustrated by a checkbox 558 in FIG. 5. The identifier could be created at data entry creation time and associated to the data entry. It could be furthermore configured at any moment (one the data entry already exists), in order to indicate if said operation is to be applied or not.

The method may further comprise the step of managing the first status information and/or the third status information such that the first status information and/or the third status information cannot be modified by any of the client, and the further client.

In particular, the directory database may determine whether "some change is performed in entry "e"", and may accordingly update the entryDigest value in the entry "e" and may store the updated value, as illustrated by the checkbox 566 and the box 568 of FIG. 5.

The method may further comprise the step of sending at least one status information from a group comprising the first status information, the second status information, the third status information, and the forth status information to the client respectively the further client, the client respectively the further client being configured to process the received at least one status information for a sending to the directory database in association with the request respectively the further request for requesting modification.

Figure 6:
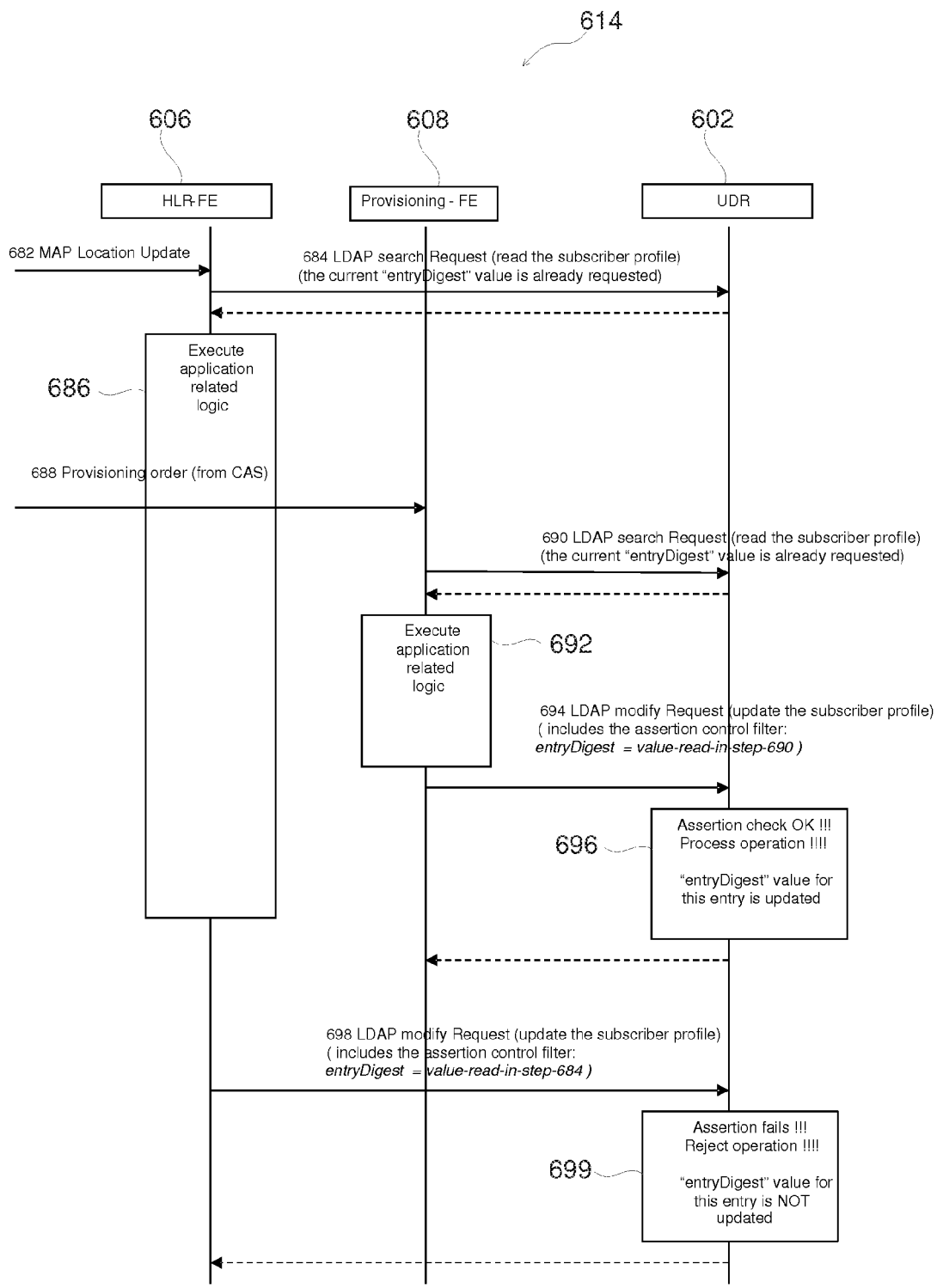
FIG. 6 is a flow diagram illustrating a method for data management at a directory database according to another exemplary embodiment of the invention.

For example, in steps 684 or 690 in FIG. 6, entry digest information as an example for status information is sent to a HLR-FE and a provisioning-FE which are examples for a further client and a client, respectively.

In the method at least one step concerning receiving and/or sending between the directory database and the client and/or the further client may be performed according to LDAP.

In the method the request for modifying and/or the further request for modifying may comprise a LDAP Assertion control comprising the second status information respectively the forth status information. In the context of the application, the term "LDAP Assertion control" may be used in a synonymous manner with the term "LDAP Assertion extension control".

In the following, a directory database according to an exemplary embodiment of the invention will be described. The directory database may be adapted to perform a method for data management at a directory database as described above. In particular, the directory database may be adapted for associating the data entry with first status information representing a first current storage status of the data entry at the directory database. In addition, the directory database may be adapted for receiving from a client a request for modifying the data entry, and for receiving from the client, in association with the request, second status information representing a second current storage status of the data entry at the directory database. The second current storage status may indicate a latest available current storage status of the data entry as available to the client. In addition, the directory database may be adapted for modifying the data entry according to the request if the first status information and the second status information may be determined to match regarding the first current storage status of the data entry at the directory database and the second current storage status as received from the client.

The present invention also concerns a computer program comprising portions of software codes, in order to implement a method as described above when operated at a directory database. The computer program can be stored on a computer readable medium. A computer-readable medium can be a permanent or rewritable memory within a directory database or located externally. The computer program can be also transferred to a directory database for example via a cable or a wireless link as a sequence of signals.

A computer program to be executed by a processing unit of a directory database may comprise code adapted to perform the steps of a method for data management at a directory database as described above.

A computer program product may comprise the computer program as described above.

In the following, a method for data management at a directory database comprising a data entry in a directory is described as particularly performed by a client. The method may comprise the following steps of receiving first status information representing a first current storage status of the data entry at the directory database, associating second status information representing a second current storage status of the data entry at the directory database with a request for modifying the data entry based on the first status information, the second current storage status indicating a latest available current storage status of the data entry as available to the client, and sending the request for modifying the data entry in association with the second status information.

Next, exemplary embodiments of the method as described in the previous paragraph will be explained. However, these embodiments may also apply to the respective method for data management at a directory database, the respective directory database, the respective computer program, the respective computer program product, the respective client, and the respective communication system as described in the "Summary of the invention" section and "Detailed description" section.

The method may comprise the further steps of storing the first status information in a storage unit of the client and retrieving the first status information from the storage unit and basing the second status information on the first status information.

At least one step concerning the receiving and/or the sending between the directory database and the client may be performed according to Lightweight Directory Access Protocol. Accordingly, the request for modifying may comprise a Lightweight Directory Access Protocol Assertion control comprising the second status information.

In the following, a client according to an exemplary embodiment of the invention will be described. The client may be adapted to perform a method for data management at a directory database as described above for the client. In particular, the client may be adapted for receiving first status information representing a first current storage status of a data entry at a directory database, associating second status information representing a second current storage status of the data entry at the directory database with a request for modifying the data entry based on the first status information, the second current storage status indicating a latest available current storage status of the data entry as available to the client, and sending the request for modifying the data entry in association with the second status information.

In the following, a communication system according to an exemplary embodiment of the invention will be described. A communication system may comprise a directory database according to an exemplary embodiment of the invention as described above and at least one client also as described above. Furthermore, the communication system may comprise a further client requesting modification of the data entry at the directory database. In particular, the client and/or the further client may send respective status information in association with a (further) request for modification of the data entry. In particular, communication in the communication system may be based on LDAP.

The invention may be implemented in a Central User Data Base (CUDB) in User Data Consolidation (UDC) solution, storing user application-related data for applications (e.g. HLR, AuC), HSS, etc.). CUDB may play a (3GPP standard) UDR role in a commercial UDC solution Referring to FIGS. 3 and 4, a method for data management at a directory database according to first and second exemplary embodiments of the invention will be described, respectively.

Figure 3:
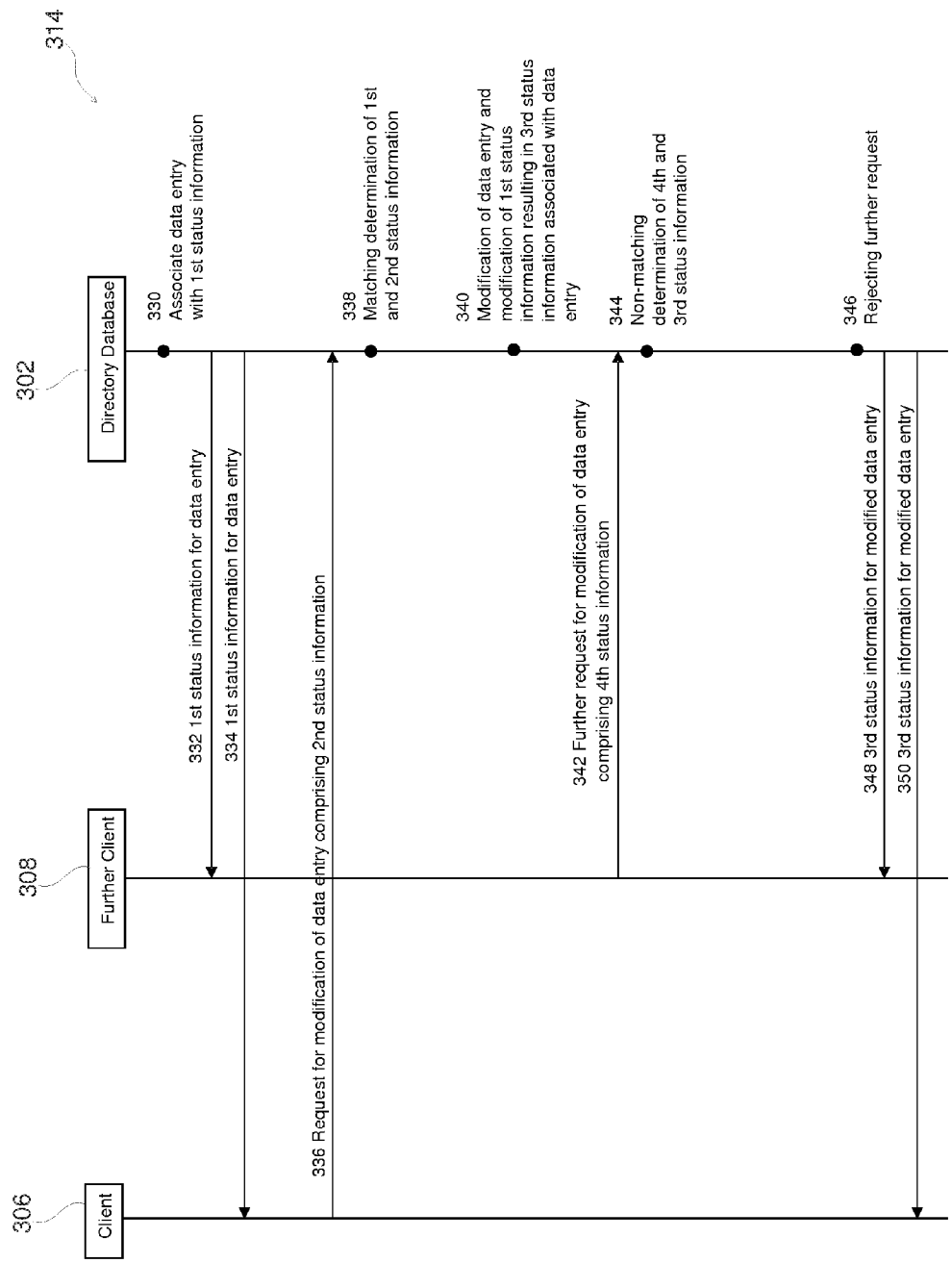
FIG. 3 is a flow diagram illustrating a method for data management at a directory database according to an exemplary embodiment of the invention.

FIG. 3 shows a first embodiment with messages communicated between a directory database 302, a client 306, and a further client 308 and operations performed at the respective devices. The directory database 302, the client 306, and the further client 308 form a communication system 314.

In a first step 330, the directory database 302 associates a data entry at the directory database with first status information which represents a first current storage status of the data entry at the directory database 302. In particular, the first status information may have been previously generated by the directory database 302.

In further steps 332 and 334, the directory database 302 sends the first status information for the data entry to the client 306 and to the further client 308, respectively. The client 306 respectively the further client 308 may store the received first status information in a storage unit of the client 306 respectively the further client 308.

Next, in a step 336, the client 306 sends a request for modification of the data entry comprising second status information. The second status information is based on the first status information in that the client 308 retrieves the first status information from the storage unit and obtains the second status information based on the retrieved first status information. The second status information represents a second current storage status of the data entry at the directory database 302, wherein the second current storage status indicates a latest available current storage status of the data entry as available to the client 306. In this embodiment, the first and second status information may be identical.

In a next step 338, the directory database 302 executes a determination of a matching of the first status information at the directory database 302 and the received second status information (particularly received) from the client 306. As according to this embodiment the second status information equals the first status information, the matching determination is in the affirmative. In particular, this determination may be evaluated to be "YES". The directory database 302 then executes a modification of the data entry at the directory database 302, and particularly updates the respective data, e.g. a value, stored in the data entry. This results in a modified data entry at the directory database 302. Further, the directory database 302 executes a modification of the first status information associated with the data entry resulting in third status information associated with the modified data entry.

Next, in a step 342, the further client 308 sends a further request for modification of the data entry to the directory database 302. The further request comprises fourth status information. The fourth status information is based on the first status information in that the further client 308 retrieves the first status information from its storage unit and obtains the fourth status information based on the retrieved first status information. The fourth status information represents a fourth current storage status of the data entry at the directory database 302, wherein the fourth current storage status indicates a latest available current storage status of the data entry as available to the further client 308. In this embodiment, the first and fourth status information may be also identical.

In a next step 344, the directory database 302 executes a determination of a non-matching of the third status information at the directory database 302 and the received fourth status information (particularly received) from the further client 308. As according to this embodiment the fourth status information equals the first status information which is outdated as is has been replaced in the meantime by the third status information, the matching determination is in not the affirmative. In particular, this determination may be evaluated to be "NO".

In a next step 346, the directory database 302 then rejects the further request for modification received from the further client 308.

In steps 348 respectively 350 the directory database 302 sends the third status information for the modified data entry to the client 306 respectively the further client 308. The client 306 and the further client 308 may then store the received third status information in the storage units thereof.

Figure 4:
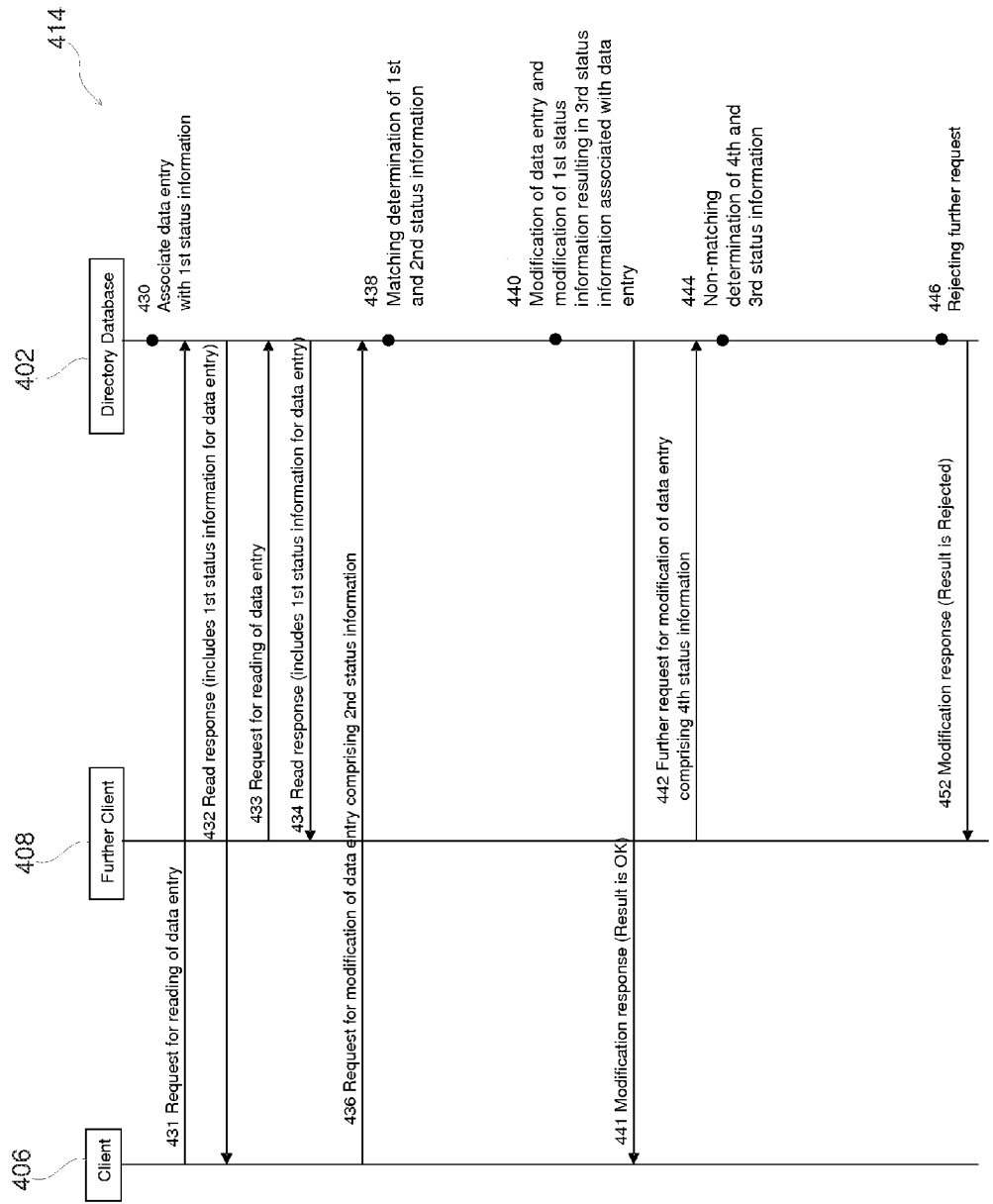
FIG. 4 is a flow diagram illustrating a method for data management at a directory database according to another exemplary embodiment of the invention.

FIG. 4 shows a second embodiment with messages communicated between a directory database 402, a client 406, and a further client 408 and operations performed at the respective devices. The directory database 402, the client 406, and the further client 408 form a communication system 414.

In a first step 430, the directory database 402 associates a data entry at the directory database 402 with first status information which represents a first current storage status of the data entry at the directory database 402. In particular, the first status information may have been previously generated by the directory database 402.

In a next step 431, the client 406 sends a request for reading of the data entry to the directory database 402. In a step 432, the directory database 402 sends a read response message to the client 406 which includes the first status information associated with the data entry and particularly the data of the data entry. The client 406 may store the received first status information in a storage unit of the client 406.

In a next step 433, the further client 408 sends a request for reading of the data entry to the directory database 402. In a step 434, the directory database 402 sends a read response message to the further client 406 which includes the first status information for the data entry and particularly the data of the data entry. The further client 406 may also store the received first status information in a storage unit of the further client 406.

Next, in a step 436, the client 306 sends a request for modification of the data entry comprising second status information. As described with reference to FIG. 3, the second status information is based on the first status information and represents a second current storage status of the data entry at the directory database 402, wherein the second current storage status indicates a latest available current storage status of the data entry as available to the client 406. In this embodiment, the first and second status information may comprise different formats which may result from the process of basing the second status information on the first status information.

In a next step 438, the directory database 402 executes a determination of a matching of the first status information at the directory database 402 and the received second status information (particularly received) from the client 406. As according to this embodiment the second status information equals the first status information, the matching determination is in the affirmative. In particular, as already stated with reference to FIG. 3, this corresponds to the determination resulting in "YES".

In a next step 440, the directory database 402 then executes a modification of the data entry at the directory database 402 and particularly updates the respective data, e.g. a value, stored in the data entry. This results in a modified data entry at the directory database 402. Further, the directory database 402 executes a modification of the first status information associated with the data entry resulting in third status information associated with the modified data entry.

In a further step 441, the directory database 402 then sends a modification response to the client 302 and particularly acknowledges the executed modification of the data entry using the sequence "Result is OK".

Next, in a step 442, the further client 408 sends a further request for modification of the data entry comprising fourth status information. As explained with reference to the step 342 of FIG. 3, the fourth status information is based on the first status information and represents a fourth current storage status of the data entry at the directory database 402, wherein the fourth current storage status indicates a latest available current storage status of the data entry as available to the further client 408. In this embodiment, the first and fourth status information may comprise different formats which may result from the process of basing the second status information on the first status information.

In a next step 444, the directory database 402 executes a determination of a non-matching of the third status information at the directory database 402 and the received fourth status information (particularly received) from the further client 408. As according to this embodiment the fourth status information equals to the first status information which is outdated as is has been replaced in the meantime by the third status information, the matching determination is in not the affirmative. In particular, it is evaluated that the determination results in "NO".

The directory database 402 accordingly rejects the further request for modification in a step 446.

Thereupon, in a step 452, the directory database 402 sends a modification response to the further client 408 comprising the content "Result is Rejected", in order to indicate to the further client 408 that the result of the determination of the matching is not in the affirmative and particularly that the processing of the further request for modification is rejected.

In the second embodiment (FIG. 4), the directory server 402 only send data to the client(s) 406, 408 as requested from them (that is the reason for the first Read request coming from the "client" 406 and the "further client" 408, so they can get the current "1st storage status", particularly as illustrated in steps 431-434 of FIG. 4). In FIG. 3, in the first embodiment (instead of a pull-mechanism with request-response as in embodiment 2 (FIG. 4),), a push-mechanism is used, e.g. the directory database 302 pushes the 1st status information for the data entry to the client(s) 306, 308, similar the 3rd status information, particularly as illustrated in steps 332, 334, 348, 350. It is noted that status information for a data entry is preferably relatable to the data entry at the client(s) 306, 308, 406, 408 to enable the client(s) 306, 308, 406, 408 to associate the status information with information regarding the data entry for which modification is requested in the request for modification of the data entry comprising the status information.

The client/further client 306, 308, 406, 408 send the previously read first storage status (attached to the Modify Request as the 2nd/4th storage status information, particularly as illustrated in the steps 336, 342, 436, 442 of FIGS. 3 and 4) as it is the Directory 302, 402 (DB) the one comparing this value to the current storage status associated to the entry (1st storage status information in case of "client" 306, 406 and 3rd storage status information in case of "further client" 308, 408, particularly as illustrated in the steps 338, 344, 438, 444 of FIGS. 3 and 4). The client(s) 306, 308, 406, 408 receive 1st status information for a data entry, and store this information in a storage unit. When the data entry needs to be modified, the client(s) 306, 308, 406, 408 retrieve the stored status information and associate it to a request for modification of the data entry (e.g. attach or include it to the request) and send it to the directory database 302, 402 for requesting modification of the data entry (particularly as illustrated in the steps 336, 342, 436, 442 of FIGS. 3 and 4). Typically, the 1st and the 2nd as well as the 4th status information are identical, e.g. have an identical value. However, there might be implementations where the 1st and 2nd and the 1st and 4th status information are not identical, e.g. the respective information is in a different format, e.g. in order to store the 1st status information as 2nd status information respectively 4th status information at the respective clients 306, 308, 406, 408. In a next step, they (particularly the first, second and fourth status information, respectively,) are retrieved according to the stored format and are associated (e.g. attached or included) to the respective request for modification messages and sent to the directory database 302, 402 which is configured to determine the matching respectively non-matching irrespective of a different format (particularly as illustrated in the steps 336, 338, 342, 344, 436, 438, 442, 444 of FIGS. 3 and 4). A client 306, 308, 406, 408 may have similar structural features as the directory database DB11 shown in FIG. 7.

In the second embodiment (FIG. 4), a modify response (indicating success or error) is required from the clients 406, 408, so the "modify process" can be finished (particularly as illustrated in the steps 441, 452 of FIG. 4). In the first embodiment, the modify response (indicating success and error) may be implicit by sending the 3rd status information (particularly as illustrated in the steps 348, 350 of FIG. 3) such that the client(s) 306, 308 have the most current status information available according to the modification for a later modification request for this data entry (not shown). The messages in the first embodiment sent from the directory database 302 to the client 306 and further client 308 may comprise information as in the second embodiment to explicitly indicate the success and failure, respectively.

In the following, a method for data management at a directory database according to other exemplary embodiments of the invention will be described with reference to FIGS. 5, 6 and 7. In a method according to an exemplary embodiment of the invention, a main goal is to define a LDAP available mutual-exclusion mechanism that is managed, executed, and is enforced in the LDAP Directory Server side (i.e. UDR), and does not depend on all integrated LDAP clients following the right behaviour (as "wrong" client behaviours are also identified and rejected from the LDAP Directory Server side).

In particular, there may be a desire for a data management at a directory database when receiving a request for modification of a data entry at the directory database particularly independent of whether the received request for modification may be issued towards the directory database in accordance with constraints posed by the directory database or not. In particular, in this context, the term "right behavior of a client" may denote a client sending a respective request for modification in accordance with the constraints posed by the directory database, and the term "wrong behavior of a client" may denote a client sending a respective request for modification not in accordance with the constraints posed by the directory database.

The present invention is not limited to 3GPP UDC Rel-9 compliant environments. It is also valid for any implementations of directory databases, especially LDAP-based environments, where client concurrency must be "controlled" (for illustration, the present invention is completely based on LDAP concepts but not limited to).

In the solution being presented it is the LDAP Directory Server side the one enforcing the mutual-exclusion (mutex) mechanism on those entries where data-consistency risks could arise, and (only) for the selected LDAP clients. And it is done independently on the right or wrong behaviour from the LDAP client issuing the "LDAP modify Request" operation towards those directory entries.

In particular, the directory database (such as the LDAP server) may ensure that a request for modification received from a client (such as a LDAP client) in accordance with a configuration of the directory database may result in a proper processing of the request for modification. Accordingly, in order to fulfill requirements of the particular configuration of the directory database, the client issuing the request for modification may be modified to be able to send a proper request for modification (in accordance with the directory database configuration). In particular, in this context, the term "right behavior of a client" may denote a client sending a respective request for modification in accordance with a configuration of the directory database associated with the processing or non-processing of the received request for modification, and the term "wrong behavior of a client" may denote a client sending a respective request for modification not in accordance with the configuration of the directory database associated with the processing or non-processing of the received request for modification. In particular, a configuration of the directory database may particularly denote a registration of a client for applying the mutex mechanism as defined above, a configuration of the data entry to be modifiable in accordance with the mutex mechanism as defined above, and an associating of the request for modification with status information (such as an "entryDigest" value) upon the sending of the request for modification from the client. In particular, a right respectively wrong behavior of the client may denote the client sending the request for modification in association with the status information respectively not in association with the status information.

In the following, the required steps at (i) a configuration phase [Step 1], (ii) a provisioning phase [Step 2] and (iii) traffic phases [Step 3] to properly implement the mechanism are described:

In a [Step 1], a Configuration Phase, a LDAP client "mutex configuration" in LDAP directory server side is performed.

In order to establish a LDAP session towards a standard LDAP Directory Server some client configuration is always required to be stored in the LDAP Directory Server side (e.g. at least "username" and—encrypted or digested—"password" to be used by the LDAP clients at LDAP session establishment).

It is proposed to include some new configuration data (e.g. into the directory entries storing the client credentials) where it is specified if the mutex mechanism must (or must not) be applied for "LDAP modify Request" operations issued from each of these clients.

A recommended implementation may include a new LDAP attributeType (syntax: Boolean) contained in a new auxiliary objectclass to be added to client-credential directory entries. If this attribute is not present or if it is set to value "FALSE", then mutex would not be applied for update operations issued from this LDAP client.

In a [Step 2], a Provisioning Phase, LDAP entry "mutex enabling" at directory entry creation time is performed.

For each new directory entry being created (through a "LDAP add Request" operations) it is specified whether mutex is required (or not) to be performed on "LDAP modify Request" operation issued towards this entry. In case mutex mechanism is required in an entry, it will only apply when a modify operation towards that entry is issued from a "LDAP client" that has been configured to "be checked against it" (see [Step 1] above and general algorithm in a [Step 3] below).

In addition, for each of these directory entries, the Directory Server must manage (internally) some data (referred here as the "entryDigest" data) storing a value that
- cannot be modified by any LDAP client (but can be always read—when not restricted from any access control instruction (ACI)—if so requested through from a LDAP client through a "LDAP search Request" operation). It is noted that it would always be possible to define (by configuration procedures) some privileged user that would be allowed to request to "update/set" this internal data (e.g. the provisioning entities, the directory root user, etc.), however for the "normal" (i.e. not-such privileged) client, modification is not possible.
- is updated internally (i.e. by the LDAP Directory Server itself) each time a "LDAP modify Request" operation is correctly applied on the associated entry (so the value stored in this internal "entryDigest" element would represent the current directory entry content, changing its value as soon as some of the stored value in at least one of the other attributeTypes contained in the same entry is changed).

A recommended implementation may include an "entryDigest" being defined (and managed) as an operational attribute maintained internally by the directory server and not modifiable by LDAP clients (see section 3.4 in LDAP Directory Information Models (I ETF RFC 4512) available via http://tools.ietf.org/html/rfc4512#section-3.4). It would be contained in a new auxiliary objectclass to be added (or not) in each created directory entry.

When this new objectclass would be present in a directory entry it would mean that the mutex mechanism must be enforced for update operations issued towards this entry. "entryDigest" attributType could be defined with syntax "Integer, storing a hash value computed from the whole current entry content".

In a [Step 3], a Traffic Phase, "mutex" enforcement at LDAP server side is performed.

When a "LDAP modify Request" operation is received in the LDAP Directory Server, the mutex mechanism is applied if (and only if) the following two conditions match:
1. It is received from a LDAP Client that has been configured so the mutex check must be applied for operations issued from it (see [Step 1]).
2. The target directory entry has been configured (at creation time) for that mutex check (see [Step 2]).

In this case (but only in this case) it is required each "LDAP modify Request" operation being received in the Directory Server to include a "LDAP Assertion control". In LDAP Assertion Control (I ETF RFC 4528) available via http://tools.ietf.org/html/rfc4528, which contents are hereby incorporated by reference herein, it is described that "LDAP modify Request" operations issued by the LDAP client may include an assertion control with a condition to be checked at LDAP server side; if the condition may not be fulfilled, the whole "LDAP modify Request" operation may be rejected. Accordingly, the new "LDAP Assertion extension control" contains the following assertion condition:

"entryDigest=<last-entryDigest-read-value-for-target-entry>"

If this equality filter is not included in the received "LDAP modify Request" operation, the whole modify operation is rejected.

If the equality filter included in the LDAP Assertion evaluates to FALSE, the whole modify operation is rejected (in accordance with RFC 4528).

If the equality filter included in the LDAP Assertion evaluates to TRUE, the received "LDAP modify Request" operations is normally processed (in accordance with LDAP: The Protocol (IETF RFC 4511) available via http://tools.ietf.org/html/rfc4511 which contents are hereby incorporated by reference herein) and if some values are finally added/deleted/replaced (in the target entry) a new value is generated (internally, by the Directory Server) and stored as the new computed "entryDigest" data for that directory entry.

Referring to FIG. 5, a whole flowchart is shown describing the extra-processing steps required at LDAP Directory Server side for each "LDAP modify Request" operation being received.

In particular, FIG. 5 illustrates a process in accordance with a method for data management according to another exemplary embodiment of the invention. The process steps are executed by a directory database.

In a first step indicated by a box 554, an LDAP Modify Request operation is received from an LDAP client named "c" for a directory entry named "e". In a next step indicated by a checkbox 556, it is determined whether the mutex mechanism is to be applied on the LDAP client "c". If this determination is in the affirmative and results in "YES", in a next step indicated by a checkbox 558, it is determined whether the mutex mechanism is to be applied on the entry "e". If this determination is in the affirmative and results in "YES", in a next step indicated by a checkbox 560, it is determined whether the received operation includes an LDAP Assertion Control which carries the filter "entryDigest=value".

If the determination of the checkbox 560 is in the affirmative and results in "YES", in a next step indicated by a checkbox 562, it is determined whether the current value stored in the attribute "entryDigest" associated with the entry "e" equals (as an example for a match) the particular <value> received in the assertion filter. If this determination is in the affirmative and accordingly results in "YES", in a next step indicated by a box 564, the received LDAP Modify Request operation is accordingly processed.

Next, in a step indicated by a checkbox 566, it is further determined whether some change(s) have been performed in the entry "e". If this determination is in the affirmative and results in "YES", in a next step indicated by a box 568, a new value for the "entryDigest" attribute in the entry "e" is generated and stored in association with changed entry "e". Afterwards, the process ends as indicated by a circle 570.

The following steps may also be performed depending on the result of the determinations of the checkboxes 556, 558, 560, 562, 566 wherein regarding checkboxes 556 and 558 it is differentiated between two embodiments denoted by "No (Alt 1)" and "No (Alt2)".

In case one of the determinations according to the checkboxes 556 and 558 are not in the affirmative and results in "NO (Alt1)" the process may proceed to the box 564 and the received LDAP Modify Request operation may be accordingly processed. Afterwards the process may then proceed as depicted.

Alternatively, in case one of the determinations according to the checkbox 556 and 558 are not in the affirmative and results in "NO (Alt2)" the method proceeds to a step indicated by a box 572 in which the received LDAP modify request operation is processed. Afterwards the method may end as indicated by a circle 574.

For both alternatives, the determinations according to the checkboxes 556 and 558 may help to differ between a pre-configuration of the directory database regarding the kind of client (registered client versus non-registered client) and the kind of data entry requested to be modified (data entry configured for being modified in accordance with the mutex method and data entry not configured for being modified in accordance with the mutex method). Both, Alt 1 and Alt result in a processing of the received LDAP modify request operation. However, for Alt 1, in addition it is checked according to 556 whether entry "e" has been changed, and if so, to modify the entryDigest attribute and to store it in association with the changed entry "e" as depicted by box 568. While Alt 2 might be interesting for legacy implementations, Alt1 is more secure and provides for better data consistency. Alt 1 is therefore in line with the general procedure required for any received LDAP assertions, here however lacking the step of checkbox 562 because in case of "No (Alt1)" there is no need to check the condition as specified in checkbox 562 for non-mutex enabled clients and directory entries.

Further, in case the determination according to the checkbox 560 is not in the affirmative, the method may proceed to a step indicated by a box 576 in which the received LDAP modify request operation is rejected. Afterwards the method may end as indicated by a circle 578. Thus, the determination according to the checkbox 560 may help to differ between clients having a "right behaviour" and a "wrong behavior", for example, to differ between the client sending the request for modification with the filter and without the filter.

Further, in case the determination according to the checkbox 562 is not in the affirmative and results in "NO", the method may proceed to the steps indicated by the box 576 and the circle 578, i.e. the received LDAP modifying request operation is rejected and the method stops.

Further, in case the determination according to the checkbox 566 is not in the affirmative and results in "NO", the method may directly proceed to the circle 570 and may accordingly end.

It is noted that the assembly of steps according to the checkbox 562, the boxes 564, 576, and the circle 578 may represent a general procedure required for any received LDAP assertion. These steps may particularly correspond to a check of the received assertion-filter. Here the assembly is denoted by 580 and is indicated by a dashed line.

It is noted that the above mentioned determinations may be executed for an attribute of a directory entry instead for the directory entry itself.

Referring to FIG. 6, there is a sequence-diagram illustrated which show how the mechanism particularly described with reference to FIG. 5 is able to detect the collision. In particular, respective messages are communicated between a directory database 602, a client 606, and a further client 608 and operations performed at the respective devices. Here, for illustration purpose only, the client 606 is embodied as a HLR-FE entity, and the further client 608 is embodied as a Provisioning-FE entity. The directory database 602, the client 606, and the further client 608 form a communication system 614.

In a first step 682, the HLR-FE 606 receives a MAP location update particularly from a subscriber.

Next, in a step 684, a LDAP search request for reading the subscriber profile is sent from the HLR-FE 606 to the UDR 602. It is noted that the current "entryDigest" value has already been requested from the UDR 602 such that the UDR 602 may send only information pertaining to the requested subscriber profile to the HLR-FE 606.

Next, in a step 686, the HLR-FE 606 executes an application related logic particularly based on the received subscriber profile information.

In a next step 688, the Provisioning-FE 608 receives a Provisioning order particularly from the CAS.

In a next step 690, the Provisioning-FE 608 sends a LDAP Search Request for reading the subscriber profile particularly stored in the UDR 602 to the UDR 602. Here, the current "entryDigest" value has already been requested from the UDR 602 such that the UDR 602 may accordingly send the data pertaining to the subscriber profile to the Provisioning-FE 608 and the previously requested entryDigest value.

In a next step 692, the Provisioning-FE 608 executes application related logic.

In a next step 694, the Provisioning-FE 608 sends an LDAP Modify Request message for updating the subscriber profile to the UDR 602. In the sent request message the assertion control filter "entryDigest=value-read-in-step-690" is also included.

In a next step 696, the UDR 602 performs an assertion check (for example, using the step illustrated by the checkbox 562 of FIG. 5). The performed assertion check is in the affirmative such that the requested modify operation is accordingly processed (for example, as indicated by the box 564 of FIG. 5). Further, as the subscriber profile stored in the data entry at the UDR 602 is updated, a value for the "entryDigest" value for this data entry is also updated (similar to the checkbox 566 and the box 568 of FIG. 5).

In a next step, both the updated information of the subscriber profile and the updated "entryDigest" value may be sent from the UDR 602 to the Provisioning-FE 608.

In a next step 698, the HLR-FE 606 sends an LDAP Modify Request for updating the subscriber profile to the UDR 602. The assertion control filter "entryDigest=value-read-in-step-684" is included in this request message.

Next, in a step 699, the UDR 602 performs an assertion check (for example, using the step illustrated in the checkbox 562 of FIG. 5) and evaluates that the received "entryDigest" value does not match to the "entryDigest" value available in the UDR 602. Accordingly, the requested Modify Operation is rejected, for example in accordance with the box 576, and the circle 578. Further, the "entryDigest" value for the data entry is not updated.

In a next step, the UDR 602 accordingly informs the HLR-FE 606 about the rejected request for modification.

Further, it is noted that the step 686 is executed meanwhile the steps 690-696 are executed.

It is noted that in FIG. 6 it is been assumed that (i) the mutex mechanism has been enabled for the target entry and (ii) both LDAP clients 606, 608 (HLR-FE 606 and Provisioning-FE 608) have been configured so the mutex must be applied on them).

Once the present mutex mechanism has been explained, some extensions/improvements can still be included. These extensions or improvements do not change the described mutex method but may be considered as further embodiments thereof:

In a modification, (per directory entry—at entry creation time—or maybe at Directory Server level—at configuration time—) the set of attributeTypes (from the ones that can be contained in a directory entry) may be defined that do not trigger any "entryDigest" update when the contained value/s is/are changed.

In particular, a directory entry may be associated with a plurality of attribute or attributeTypes. One attributeType (for example, an attributeTpye "e" of the directory entry) or more attributeTypes may be associated with an entryDigest. However, a set of the plurality of attributeTypes may not be associated with the entryDigest. Accordingly, a modification of the one or more attribueTypes may force an update of the entryDigest value but a modification of the defined set of attributeTpyes may not force an update operation of the entryDigest.

Thus, it may be implemented in the mutex mechanism that if some attributeTypes are not included in that list particularly obtained based on the definition of attributeTpyes described above any "LDAP modify Request" operation only requesting to update (some of) these attributeType/s would not be "analyzed" by the mutex mechanism.

In particular, when receiving a request for modification the mutex mechanism may be only applied by the directory database to those attributeType(s) being configured for the appliance of the mutex mechanism as being associated with the entryDigest. Those attributeType(s) being not configured for the appliance of the mutex mechanism (and thus being not associated with the entryDigest) may be omitted in the mutex mechanism.

Further more than one "entryDigest" element may be defined per directory entry, wherein each of them may be associated with a subset of the attributeTypes contained in that entry.

In particular, a directory entry is associated with more than one attribute or attributeType. A group of these attributeTypes is associated with an entryDigest, and the remaining attributeType(s) may be associated with another entryDigest. In case of a modification of one of the attributeTpyes of the group of attributeTypes, the value of the entryDigest associated with the group of attributeTypes may be updated but not a value of the another entryDigest. Accordingly, in case of a modification of (one of) the remaining attributeType(s), the value of the another entryDigest associated with the remaining attributeType(s) may be updated but not a value of the entryDigest.

Thus, each defined group of attributeTypes is "governed" for its associated "entryDigest" element, which may allow some more fine-grained mutex mechanism in each directory entry. This may allow to increase the level of parallelism, and not to tie the mutex algorithm defined in this context to the scope of a directory entry.

In the following, a constitution of a directory database according to exemplary embodiments of the invention will be described.

In a first exemplary embodiment, the directory database may comprise a receiving unit, a storage unit, a processing unit, and optionally a transmission unit.

Figure 7:
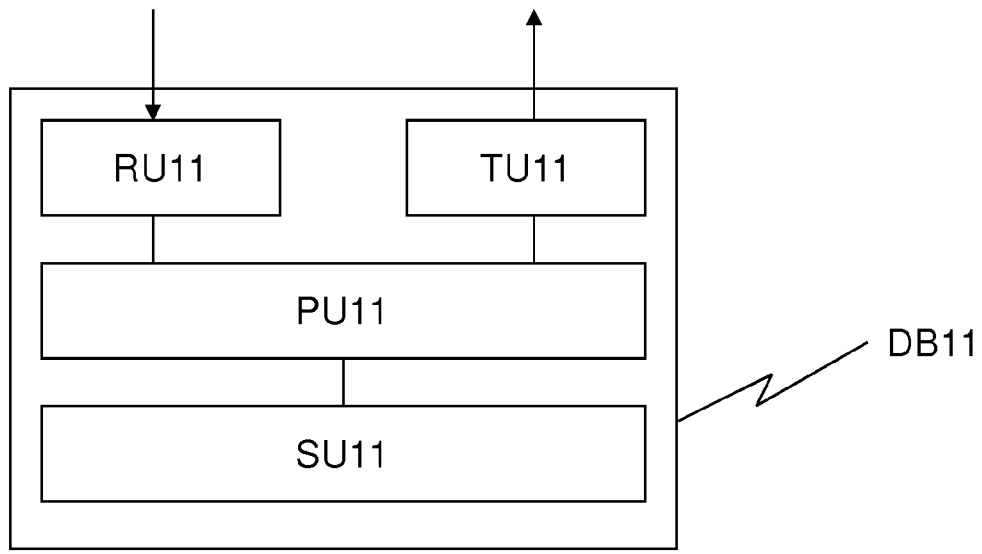
FIG. 7 illustrates a block diagram illustrating a constitution of a directory database according to an exemplary embodiment of the invention.

Referring to FIG. 7, a constitution of a directory database DB11 according to another exemplary embodiment of the invention will be explained. The embodiment of the directory database DB11 comprising a receiving unit RU11, a processing unit PU11, a storage unit SU11, and a transmission unit TU11 is depicted in the FIG. 7. The receiving unit RU11 may be adapted to receive messages and information such as a request for modifying and status information, the storage unit SU11 may be adapted to (permanently or temporarily) store the data entry in the directory as well as status information and identifiers etc, and the transmission unit TU11 may be adapted to send messages and information such as e.g. information to clients, and the processing unit PU11 may be adapted to process received as well as transmitted information and messages and to store or retrieve or modify a data entry in a directory of the storage unit SU11 at the directory database DB11.

The processing unit PU11 may be adapted to associate the data entry with first status information representing a first current storage status of the data entry at the directory database. The receiving unit RU11 may be adapted to receive from a client a request for modifying the data entry. The receiving unit RU11 may be further adapted to receive from the client, in association with the request, second status information representing a second current storage status of the data entry at the directory database, the second current storage status indicating a latest available current storage status of the data entry as available to the client. The processing unit PU11 may be adapted to modify the data entry according to the request if the first status information and the second status information are determined by the processing unit PU11 to match regarding the first current storage status of the data entry at the directory database and the second current storage status as received from the client.

According to an embodiment, the processing unit PU11 may be adapted to obtain third status information representing a modified current storage status of the modified data entry at the directory database and to associate the modified data entry with the third status information.

According to a further embodiment, the receiving unit RU11 may be adapted to receive from the client or a further client a further request for modifying the data entry at the directory database and to receiving from the client or the further client, in association with the further request, forth status information representing a forth current storage status of the data entry at the directory database, the forth current storage status indicating a latest available current storage status of the data entry as available to the client or the further client. The processing unit PU11 may be adapted to determine that the modified status information does not match to the forth status information regarding the modified current storage status of the data entry at the directory database and the forth current storage status as received from the client and to reject the further request for modifying by not modifying the modified data entry.

According to a further embodiment, the processing unit PU11 may be adapted to verify if the client and/or the further client is registered at the directory database for an appliance of one or more of the matching determination, modification, and rejection steps.

According to a further embodiment, the processing unit PU11 may be adapted to verify if the data entry is registered at the directory database for an appliance of one or more of the matching determination, modification, and rejection steps.

According to a further embodiment, the processing unit PU11 may be adapted to manage the first status information and/or the third status information such that the first status information and/or the third status information cannot be modified by any of the client and the further client.

According to a further embodiment, the transmission unit TU11 may be adapted to send at least one status information from a group comprising the first status information, the second status information, the third status information, and the forth status information to the client respectively the further client, the client respectively the further client being configured to process the received at least one status information for a sending to the directory database in association with the request respectively the further request for requesting modification.

According to a further embodiment, the processing unit PU11 may be adapted to perform at least one step concerning receiving and/or sending between the directory database and the client and/or the further client according to Lightweight Directory Access Protocol. Accordingly, the request for modifying and/or the further request for modifying may comprise a Lightweight Directory Access Protocol Assertion control comprising the second status information respectively the forth status information.

In the following, a constitution of a client according to exemplary embodiments of the invention will be described.

In a first exemplary embodiment, the client may comprise a receiving unit, a processing unit, and a transmission unit, and optionally a storage unit.

Figure 8:
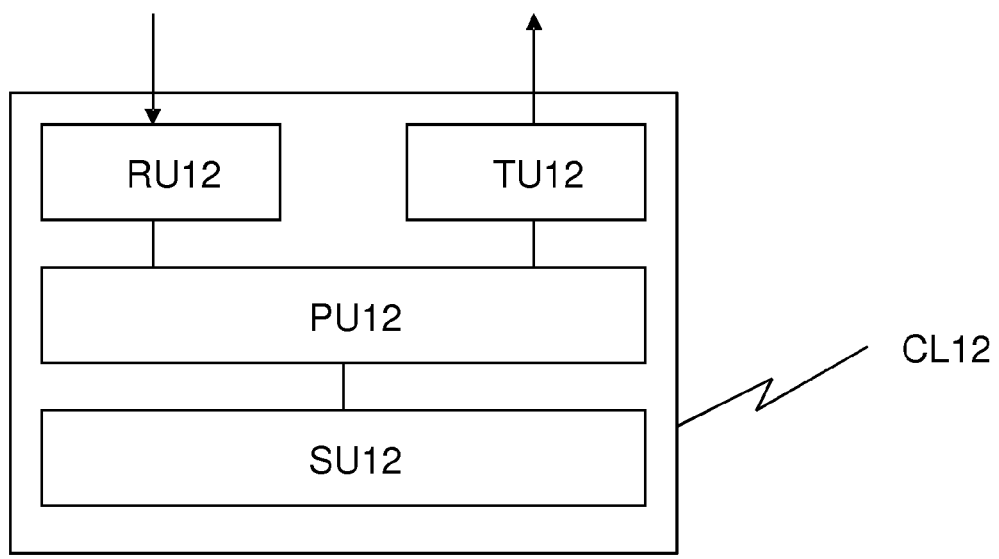
FIG. 8 illustrates a block diagram illustrating a constitution of a client according to an exemplary embodiment of the invention.

Referring to FIG. 8, a constitution of a client CL12 according to another exemplary embodiment of the invention will be explained. The client CL12 may have similar structural features as the directory database DB11 shown in FIG. 7 and described above.

The embodiment of the client CL12 comprises a receiving unit RU12, a processing unit PU12, a storage unit SU12, and a transmission unit TU12 similar as depicted in FIG. 7 for the directory database DB11. The receiving unit RU12 may be adapted to receive messages and information, the storage unit SU12 may be adapted to (permanently or temporarily) store information (such as status information for a data entry), and the transmission unit TU12 may be adapted to send messages and information, and the processing unit PU12 may be adapted to process received as well as transmitted information and messages and to store or retrieve information from the storage unit SU12.

In particular, the receiving unit RU12 may be adapted to receive first status information representing a first current storage status of the data entry at the directory database. The processing unit PU12 may be adapted to associate second status information representing a second current storage status of the data entry at the directory database with a request for modifying the data entry based on the first status information, the second current storage status indicating a latest available current storage status of the data entry as available to the client. Furthermore, the transmission unit TU12 may be adapted to send the request for modifying the data entry in association with the second status information to the directory database.

According to an embodiment, the processing unit PU12 may be adapted to store the first status information in a storage unit SU12 of the client, to retrieve the first status information from the storage unit SU12, and to base the second status information on the first status information, i.e. the retrieved first status information may be processed in a way that it forms the base for the second status information, e.g. the first one may be formatted into the second one. As explained already in detail above, the first and second status information are identical, i.e. the information that is retrieved from the storage unit SU12 forms an identical base for the second status information.

According to an embodiment, the processing unit PU12 may be adapted to perform at least one step concerning receiving and/or sending between the directory database and the client according to Lightweight Directory Access Protocol. Accordingly, the request for modifying comprises a Lightweight Directory Access Protocol Assertion control comprising the second status information.

In the following, some advantages of the invention will be described.

The mutex mechanism is controlled in the directory server side of the directory database side, and is not dependant on the right/wrong LDAP client behavior. Thus, the mutex mechanism is triggered or is initiated particularly by the directory database but not by the client(s), since the directory server may set the pre-configuration of the directory database regarding the data entry and the client used in conjunction with the mutex mechanism. No change is required in the LDAP protocol, because exact the same LDAP messages, operations and sequences as the ones defined in LDAP-related RFCs can be used. So, from a protocol point of view, backward-compatibility can be assured.

The new mutex method further allows to manage different concurrency levels, e.g. all of them from the same Directory Server and at the same time based on the nature of the Application accessing the Directory Service (i.e. concurrency requirements from the "application side") and/or the nature of the data stored in the Directory Server being accessed (i.e. concurrency requirements from the "data side"). Furthermore, an increased concurrency/parallelism may be allowed when compared with the "LDAP transaction" based solutions being managed nowadays in 3GPP UDC Rel-9.

The invention claimed is:

1. A method for data management performed at a directory database device comprising a processor circuit and a data entry in a directory, the method comprising:
   associating the data entry with first status information representing a first current storage status of the data entry at the directory database device, the first status information being data storing a value representing a current content of the data entry;
   receiving a request for modifying the data entry from a client device;
   receiving, from the client device and in association with the request, second status information representing a second current storage status of the data entry at the directory database device, the second current storage status indicating a latest available current storage status of the data entry as available to the client device; and
   modifying the data entry according to the request if the first status information and the second status information are determined to match regarding the first current storage status of the data entry at the directory database device and the second current storage status as received from the client device;
   obtaining third status information representing a modified current storage status of the modified data entry at the directory database device; and
   associating the modified data entry with the third status information.

2. The method of claim 1 further comprising verifying if the client device is registered at the directory database device for application of the modifying.

3. The method of claim 1 further comprising verifying if the data entry is registered at the directory database device for application of the modifying.

4. The method of claim 1 further comprising:
   receiving, from the client device or a further client device, a further request for modifying the data entry at the directory database device;
   receiving, from the client device or the further client device and in association with the further request, fourth status information representing a fourth current storage status of the data entry at the directory database device, the fourth current storage status indicating a latest available current storage status of the data entry as available to the client device or the further client device;
   determining that the modified status information does not match to the fourth status information regarding the modified current storage status of the data entry at the directory database device and the fourth current storage status as received from the client device; and
   rejecting the further request for modifying by not modifying the modified data entry.

5. The method according to of claim 4 further comprising verifying if the client device or further client device is registered at the directory database device for application of one or more of:
   the modifying;
   the determining; and
   the rejecting.

6. The method of claim 4 further comprising verifying if the data entry is registered at the directory database device for application of one or more of:
   the modifying;
   the determining; and
   the rejecting.

7. The method of claim 4 further comprising managing at least one of the first and third status information so as to be unmodifiable by any of the client device and the further client device.

8. The method of claim 4:
   further comprising sending at least a fifth status information from a group comprising the first status information, the second status information, the third status information, and the fourth status information to the client device or further client device; and
   wherein the client device or further client device is configured to process the received fifth status information for a sending to the directory database device in association with the corresponding request or further request for requesting modification.

9. The method of claim 4 wherein at least one of the following is performed according to Lightweight Directory Access Protocol:
   communication from the directory database device to the client device;
   communication from the client device to the directory database device;
   communication from the directory database device to the further client device; and
   communication from the further client device to the directory database device.

10. The method of claim 9 wherein the communication comprises a Lightweight Directory Access Protocol Assertion control comprising the second or fourth status information.

11. A directory database device, comprising:
   a memory circuit having a data entry in a directory;
   a receiver configured to receive a request for modifying the data entry from a client device;
   a processor circuit operatively connected to the memory circuit and the receiver; and
   wherein the directory database device is configured to:
      associate the data entry with first status information representing a first current storage status of the data entry at the directory database device, the first status information being data storing a value representing a current content of the data entry;

receive, from the client device and in association with the request, second status information representing a second current storage status of the data entry at the directory database device, the second current storage status indicating a latest available current storage status of the data entry as available to the client device; and modify the data entry according to the request if the first status information and the second status information are determined to match regarding the first current storage status of the data entry at the directory database device and the second current storage status as received from the client device;

obtain third status information representing a modified current storage status of the modified data entry at the directory database device; and associate the modified data entry with the third status information.

12. A computer program product stored in a non-transitory computer readable medium for data management at a directory database device comprising a data entry in a directory, the computer program product comprising software instructions which, when executed by a processor circuit of the directory database device, causes the directory database device to:

associate the data entry with first status information representing a first current storage status of the data entry at the directory database device, the first status information being data storing a value representing a current content of the data entry;

receive a request for modifying the data entry from a client device;

receive, from the client device and in association with the request, second status information representing a second current storage status of the data entry at the directory database device, the second current storage status indicating a latest available current storage status of the data entry as available to the client device; and modify the data entry according to the request if the first status information and the second status information are determined to match regarding the first current storage status of the data entry at the directory database device and the second current storage status as received from the client device;

obtain third status information representing a modified current storage status of the modified data entry at the directory database device; and associate the modified data entry with the third status information.

13. A method for data management at a directory database device comprising a processor circuit and a data entry in a directory, the method comprising:

receiving first status information representing a first current storage status of the data entry at the directory database device, the first status information being data storing a value representing a current content of the data entry;

associating second status information representing a second current storage status of the data entry at the directory database device with a request for modifying the data entry based on the first status information, the second current storage status indicating a latest available current storage status of the data entry as available to a client device; and sending the request for modifying the data entry in association with the second status information;

receiving third status information from the directory database device, wherein the third status information represents a modified current storage status of the modified data entry obtained at the directory database device, and is associated with the modified data entry at the database directory device.

14. The method of claim 13 further comprising:

storing the first status information in a storage unit of the client device; and retrieving the first status information from the storage unit and basing the second status information on the first status information.

15. The method of claim 13 wherein at least some communication between directory database device and the client device is performed according to Lightweight Directory Access Protocol.

16. The method of claim 15 wherein the request for modifying comprises a Lightweight Directory Access Protocol Assertion control comprising the second status information.

17. A client device in communication with a directory database device comprising a data entry in a directory, the client device comprising:

a receiver;

a transmitter;

a memory circuit; and a processor circuit operatively connected to the receiver, the transmission unit, and the storage unit; and wherein the client device is configured to:

receive first status information representing a first current storage status of the data entry at the directory database device, the first status information being data storing a value representing a current content of the data entry;

associate second status information representing a second current storage status of the data entry at the directory database device with a request for modifying the data entry based on the first status information, the second current storage status indicating a latest available current storage status of the data entry as available to the client device;

send the request for modifying the data entry in association with the second status information to the directory database device;

receive third status information from the database device, wherein the third status information represents a modified current storage status of the modified data entry obtained at the directory database device, and is associated with the modified data entry at the database directory device.

18. A communication system comprising:

a directory database device;

a client device; and wherein the directory database device comprises:

a first memory circuit having a data entry in a directory;

a first receiver configured to receive a request for modifying the data entry from the client device;

a first processor circuit operatively connected to the first memory circuit and the first receiver; and wherein the directory database device is configured to:

associate the data entry with first status information representing a first current storage status of the data entry at the directory database device, the first status information being data storing a value representing a current content of the data entry;

receive, from the client device and in association with the request, second status information representing a second current storage status of the data entry at the directory database device, the second current storage status indicating a latest available current storage status of the data entry as available to the client device;

modify the data entry according to the request if the first status information and the second status information are determined to match regarding the first current storage status of the data entry at the directory database device and the second current storage status as received from the client device;

obtain third status information representing a modified current storage status of the modified data entry at the directory database device; and associate the modified data entry with the third status information; and wherein the client device comprises:
 a second receiver;
 a second transmitter;
 a second memory circuit;
 a second processor circuit operatively connected to the second receiver, the second transmitter, and the second memory circuit of the client device; and wherein the client device is configured to:
 receive the first status information;
 associate the second status information with the request for modifying the data entry based on the first status information; and
 send the request for modifying the data entry in association with the second status information to the directory database device.

\* \* \* \* \*